US008264553B2

(12) United States Patent
Joshi et al.

(10) Patent No.: US 8,264,553 B2
(45) Date of Patent: Sep. 11, 2012

(54) HARDWARE ASSISTED IMAGE DEBLURRING

(75) Inventors: Neel S. Joshi, Seattle, WA (US); Sing Bing Kang, Redmond, WA (US); Charles L. Zitnick, III, Seattle, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 12/616,782

(22) Filed: Nov. 12, 2009

(65) Prior Publication Data

US 2011/0109755 A1 May 12, 2011

(51) Int. Cl.
*H04N 5/228* (2006.01)
*G06K 9/40* (2006.01)

(52) U.S. Cl. .......... 348/208.4; 348/208.99; 382/255

(58) Field of Classification Search .......... 348/208.99, 348/208.2, 208.4, 208.5; 382/255, 260, 264
See application file for complete search history.

(56) References Cited

U.S. PATENT DOCUMENTS

| | | | |
|---|---|---|---|
| 7,050,102 B1 * | 5/2006 | Vincent | 348/333.02 |
| 7,377,648 B2 | 5/2008 | Gross et al. | |
| 7,437,012 B2 | 10/2008 | Carasso | |
| 7,477,802 B2 | 1/2009 | Milanfar et al. | |
| 7,616,826 B2 * | 11/2009 | Freeman et al. | 382/255 |
| 7,792,357 B2 | 9/2010 | Kang | |
| 2005/0212911 A1 * | 9/2005 | Marvit et al. | 348/154 |
| 2006/0279639 A1 * | 12/2006 | Silverstein et al. | 348/208.14 |
| 2007/0258707 A1 | 11/2007 | Raskar | |
| 2008/0136923 A1 * | 6/2008 | Inbar et al. | 348/208.2 |
| 2008/0175508 A1 | 7/2008 | Bando et al. | |
| 2008/0291286 A1 | 11/2008 | Fujiyama et al. | |
| 2009/0174782 A1 * | 7/2009 | Kahn et al. | 348/208.2 |
| 2009/0179995 A1 | 7/2009 | Fukumoto et al. | |
| 2010/0033618 A1 | 2/2010 | Wong et al. | |
| 2010/0231732 A1 | 9/2010 | Baxansky et al. | |
| 2011/0019932 A1 | 1/2011 | Hong | |

OTHER PUBLICATIONS

Liu, et al., "Simultaneous Image Formation and Motion Blur Restoration via Multiple Capture" Retrieved at <<http://ieeexplore.ieee.org/xpl/freeabs_all.jsp?arnumber=941301>>, Proceedings of the Acoustics, Speech, and Signal Processing, 2001. On IEEE International Conference, vol. 03, pp. 4.

Chiang, et al., "Local Blur Estimation and Super-Resolution" Retrieved at <<http://ieeexplore.ieee.org/xpl/freeabs_all.jsp?arnumber=609422>>, 1997 IEEE Computer Society Conference on Computer Vision and Pattern Recognition (CVPR'97), pp. 6.

Elder, et al., "Local Scale Control for Edge Detection and Blur Estimation" Retrieved at <<http://eprints.kfupm.edu.sa/49035/1/49035.pdf>>, IEEE Transactions on Pattern Analysis and Machine Intelligence, vol. 20, No. 7, Jul. 1998, pp. 699-715.

(Continued)

*Primary Examiner* — Kelly L Jerabek

(57) ABSTRACT

The described implementations relate to deblurring images. One system includes an imaging device configured to capture an image, a linear motion detector and a rotational motion detector. This system also includes a controller configured to receive a signal from the imaging device relating to capture of the image and to responsively cause the linear motion detector and the rotational motion detector to detect motion-related information. Finally, this particular system includes a motion calculator configured to recover camera motion associated with the image based upon the detected motion-related information and to infer imaging device motion induced blur of the image and an image deblurring component configured to reduce imaging device induced blur from the image utilizing the inferred camera motion induced blur.

15 Claims, 5 Drawing Sheets

OTHER PUBLICATIONS

Klein, et al., "Tightly Integrated Sensor Fusion for Robust Visual Tracking" Retrieved at <<http://svr-www.eng.cam.ac.uk/~gswk2/papers/KleinDrummond2004IVC.pdf>>, Jan. 23, 2004, pp. 1-15.

Strelow, et al., "Optimal Motion Estimation from Visual and Inertial Measurements" Retrieved at <<http://www.ri.cmu.edu/pub_files/pub4/strelow_dennis_2002_1/strelow_dennis_2002_1.pdf>>, Proceedings of the Workshop on Applications of Computer Vision, Dec. 2002, pp. 6.

Tai, et al., "Image/Video Deblurring using a Hybrid Camera" Retrieved at <<http://www.cs.washington.edu/homes/duhao/papers/cvpr2008_hybriddeblurring.pdf>>, IEEE Conference on Computer Vision and Pattern Recognition (CVPR), 2008, pp. 8.

Bascle, et al., "Motion Deblurring and Super-Resolution from an Image Sequence" Retrieved at <<http://eprints.kfupm.edu.sa/51907/1/51907.pdf>>, Proceedings of the 4th European Conference on Computer Vision, vol. II, pp. 10.

Ezra, et al., "Motion-Based Motion Deblurring" Retrieved at <<http://www1.cs.columbia.edu/CAVE/publications/pdfs/BenEzra_PAMI04.pdf>>, IEEE Transactions on Pattern Analysis and Machine Intelligence, vol. 26, No. 6, Jun. 2004, pp. 689-698.

Fergus, et al., "Removing Camera Shake from a Single Photograph" Retrieved at <<http://cs.nyu.edu/~fergus/papers/deblur_fergus.pdf>>, International Conference on Computer Graphics and Interactive Techniques, Jul. 30-Aug. 3, 2006, pp. 8.

Joshi, et al., "PSF Estimation Using Sharp Edge Prediction" Retrieved at <<http://vision.ucsd.edu/kriegman-grp/research/psf_estimation/psf_estimation.pdf>>, IEEE Computer Society Conference on Computer Vision and Pattern Recognition (CVPR 2008), pp. 8.

Levin, et al., "Image and Depth from a Conventional Camera with a Coded Aperture" Retrieved at <<http://portal.acm.org/citation.cfm?id=1275808.1276464>>, International Conference on Computer Graphics and Interactive Techniques, Aug. 5-9, 2007, pp. 9.

Levin, et al., "Motion-Invariant Photography" Retrieved at <<http://people.csail.mit.edu/billf/papers/MotInv-s-LevinEtAl-SIGGRAPH08>>, International Conference on Computer Graphics and Interactive Techniques, Aug. 11-15, 2008, pp. 46.

Raskar, et al., "Coded Exposure Photography: Motion Deblurring Using Fluttered Shutter" Retrieved at <<http://www.cfar.umd.edu/~aagrawal/sig06/CodedExposureLowres.pdf>>, International Conference on Computer Graphics and Interactive Techniques, Jul. 30-Aug. 3, 2006, pp. 10.

Richardson, William Hadley, "Bayesian-Based Iterative Method of Image Restoration" Retrieved at <<http://www.opticsinfobase.org/DirectPDFAccess/E9D1328E-BDB9-137E-CB49504A28D29BAF_54565.pdf?da=1&id=54565&seq=0&CFID=51806854&CFTOKEN=37119027>, Journal of the Optical Society of America, vol. 62, No. 1, Jan. 1972, pp. 55-59.

Shan, et al., "High-Quality Motion Deblurring from a Single Image" Retrieved at <<http://www.cse.cuhk.edu.hk/~leojia/projects/motion_deblurring/deblur_siggraph08.pdf>>, ACM Transactions on Graphics, vol. 27, No. 3, Article 73, Aug. 2008, pp. 10.

Stewart, Charles V., "Robust Parameter Estimation in Computer Vision" Retrieved at <<http://pages.cs.wisc.edu/~lizhang/vision-reading/2008s/RobustParameterEst.pdf>>, SIAM Review, vol. 41, Issue 3, Sep. 1999, pp. 513-537.

Yuan, et al., "Image Deblurring with Blurred/Noisy Image Pairs" Retrieved at <<http://www.cs.ust.hk/~quan/publications/yuan-deblur-siggraph07.pdf>>, Proceedings of ACM SIGGRAPH 2007, vol. 26, Issue 3, Jul. 2007, pp. 9.

Van, et al., "Identifying Source Cell Phone Using Chromatic Aberration", IEEE International Conference on Multimedia and Expo, Jul. 2-5, 2007, pp. 883-886.

Le, et al., "Restoration of Defocus Blur Image Based on Global Phase Coherence", 2nd International Congress on Image and Signal Processing, Oct. 17-19, 2009, pp. 5.

Saifuddin, M., "Image Deblurring (Barcode)", Retrieved at http://psm.fke.utm.my/libraryfke/files/827_MUHAMMADUMARALMALIKIBINSAIFUDDIN2010.pdf>>, May 2010, pp. 122.

Agarwala, et al., "Interactive Digital Photomontage", Special Interest Group on Computer Graphics and Interactive Techniques, Aug. 8-12, 2004, pp. 1-9.

Banham, et al., "Digital Image Restoration", IEEE Signal Processing Magazine, vol. 14, No. 2, Mar. 1997, pp. 24-41.

Cannon, et al., "Blind Deconvolution of Spatially In-variant Image Blurs with Phase", IEEE Transactions on Acoustics, Speech and Signal Processing, vol. 24, No. 1, Feb. 1976, pp. 58-63.

Goodman, J., "Introduction to Fourier Optics", Third Edition, Problem Solutions, Retrieved at http://depa.usst.edu.cn/guangdian/gxxx/downloads/zyxt/Probsolutions.pdf, Sep. 22, 2005, pp. 98.

Joshi, et al., "Image Deblurring using Inertial Measurement Sensors", Special Interest Group on Computer Graphics and Interactive Techniques Conference, Jul. 26-30, 2010, pp. 1-8.

Levin, et al., "Understanding and Evaluating Blind Deconvolution Algorithms", IEEE Conference on Computer Vision and Pattern Recognition (CVPR), Jun. 2009, pp. 8.

Levin, A., "Blind Motion Deblurring using Image Statistics", Advances in Neural Information Processing Systems (NIPS), Dec. 2006, pp. 8.

Veeraraghavan, et al., "Dappled Photography: Mask Enhanced Cameras for Heterodyned Light Fields and Coded Aperture Refocusing", Mitsubishi Electric Research Laboratories; TR2007-115, Jul. 2007, pp. 14.

Xu, et al., "Two-phase Kernel Estimation for Robust Motion Deblurring", 11th European Conference on Computer Vision, Sep. 5-11, 2010, pp. 157-170.

* cited by examiner

HARDWARE ASSISTED IMAGE DEBLURRING

BACKGROUND

Digital cameras offer many conveniences over film cameras. For instance, digital cameras can allow instant viewing of pictures or images. One carryover complaint from film cameras is image blurring. Professional or advanced photographers may occasionally purposely blur an image to obtain a desired artistic affect. However, in most cases blurred images are undesired and frustrating to the user. Blurring is commonly due to motion of the camera while taking the picture. This camera motion blur often occurs in light-limited situations and is perhaps the single most common reason for discarding a photograph.

SUMMARY

The described implementations relate to deblurring images. One implementation can include an image sensor configured to capture an image. This implementation can also include a motion-related information assembly configured to obtain information relating to both rotational motion and linear motion of the imaging device upon image capture.

Another implementation can obtain a photo captured by a camera and rotational and linear motion information associated with photo capture. The implementation can calculate camera motion during the photo capture from the rotational and linear motion information. This implementation can deblur portions of the photo utilizing the calculated camera motion.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application relates to deblurring of images (i.e., photos). The images can be captured by an imaging device, such as a dedicated camera or video camera, or by a device that offers a camera functionality, such as a cell phone, smart phone, or personal digital assistant, among others. As used herein, a device that contains a camera functionality can be thought of as a camera regardless of other functionalities offered by the device. Some implementations can gather motion-related information about the imaging device when the image is captured. For instance, the motion-related information can relate to linear motion, rotational or angular motion, velocity, and/or acceleration, among others. The motion-related information can be used with the image to compensate for or correct blurring caused by the motion of the imaging device. In some cases, the motion-related information can be used to remove blur from the image in a uniform manner. In other cases, the motion-related information can be used non-uniformly with the image. For instance, some regions of the image may be treated differently than other regions. In one such example, the motion-related information can be used with the image at an individual pixel level. Considered from another perspective, the motion-related information can be thought of as defining a blur function. By knowing the blur function, a corrected or true image can be recovered by deblurring the captured image with a non-blind deconvolution method.

Figure 1:
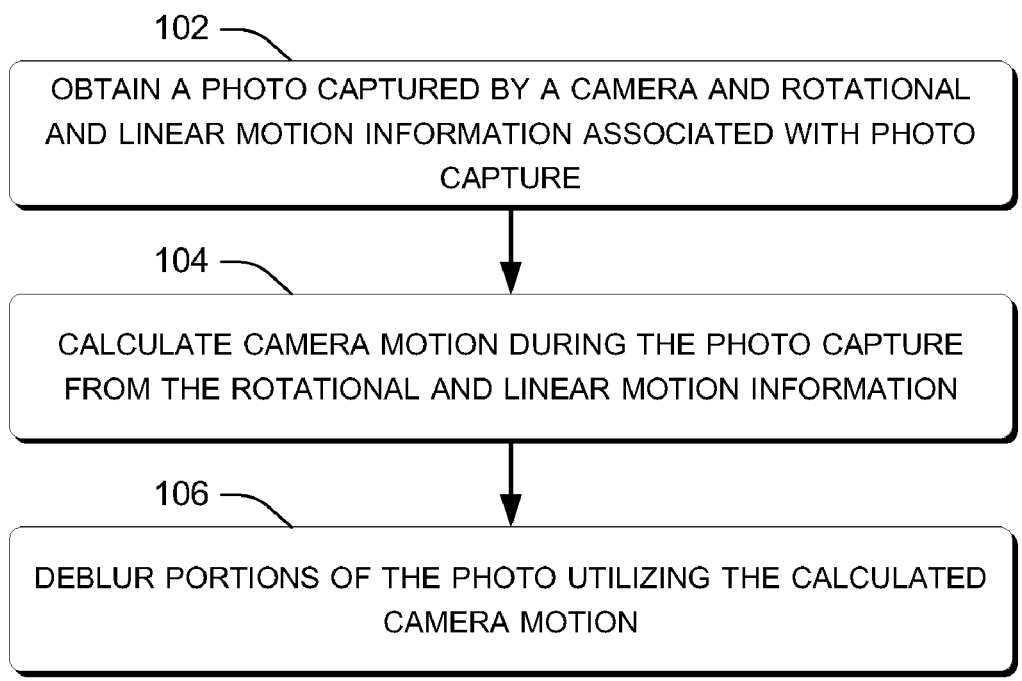
FIG. 1 is a flowchart of exemplary image deblurring technique in accordance with some implementations of the present concepts.

For introductory purposes, consider FIG. 1, which shows a method 100 for deblurring images. In this case at block 102, the method can obtain a photo captured by a camera and rotational and linear motion information associated with capture of the photo. For instance, if the photo relates to an exposure of, for example, 0.1 seconds, then the rotational and linear motion information can relate to that same 0.1 seconds. Thus, the rotational and linear motion information can capture and convey movement of the camera while taking the photo.

At block 104, the method can calculate camera motion during the photo capture from the rotational and linear motion information. Viewed from one perspective, this process can be thought of as calculating camera motion without regard to the photo. Subsequently, the method can utilize the calculated camera motion with regard to the image to address image blurring. In some situations, this multi-step approach can be more performant than directly applying the linear and rotational motion information of block 102 to the photo.

At block 106, the method can deblur portions of the photo utilizing the calculated camera motion. In some cases, some portions of the photo may be affected by the camera motion differently than other portions. Some implementations can allow individual portions of the photo to be deblurred based upon the calculated camera motion for those portions. In some cases, the portions can include a single pixel or multiple pixels. In some instances, where the portions comprise individual pixels the deblurring can be performed on a pixel-by-pixel basis.

System Examples

Figure 2:
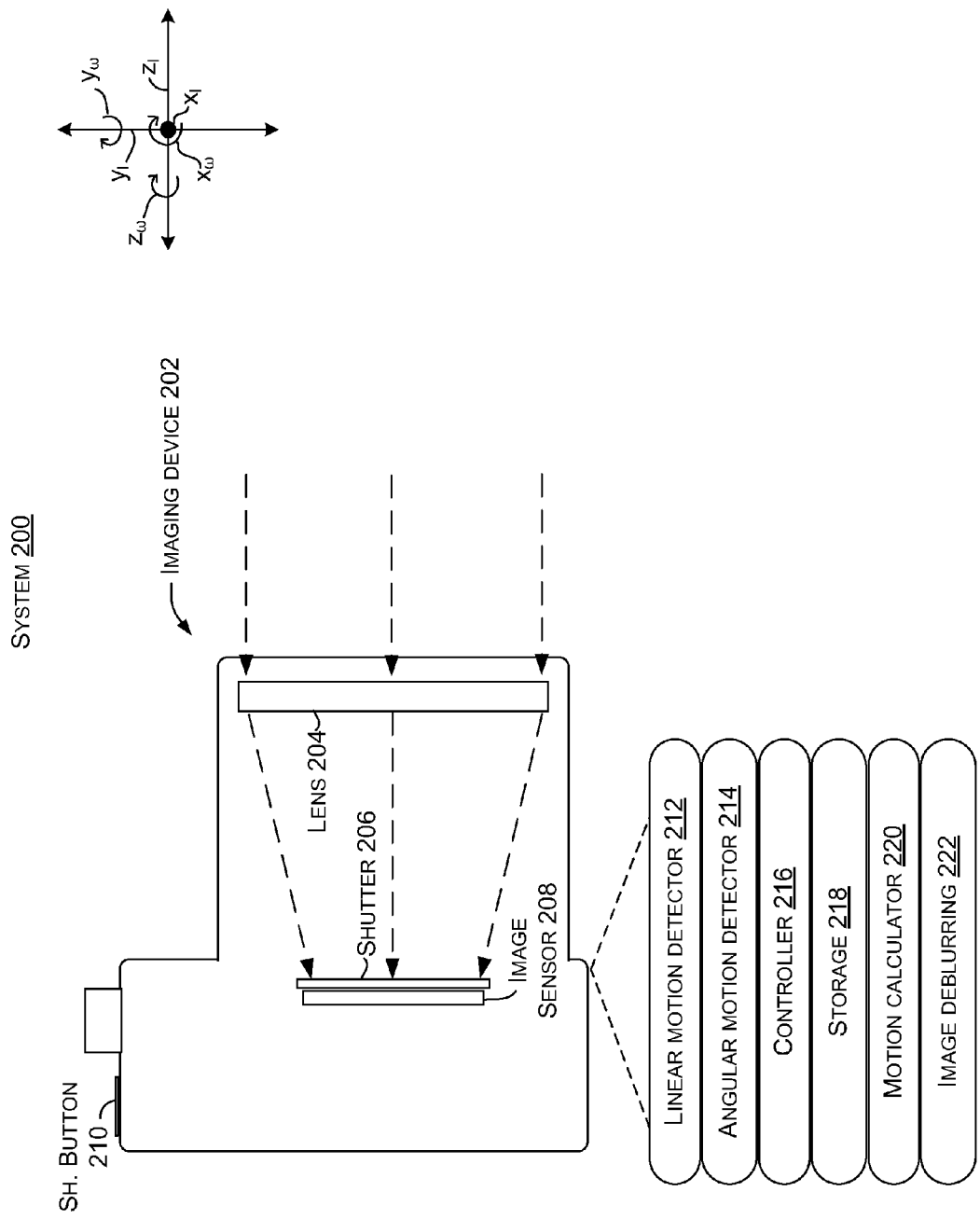
FIGS. 2-4 show exemplary image deblurring systems in accordance with some implementations of the present concepts.
Figure 3:
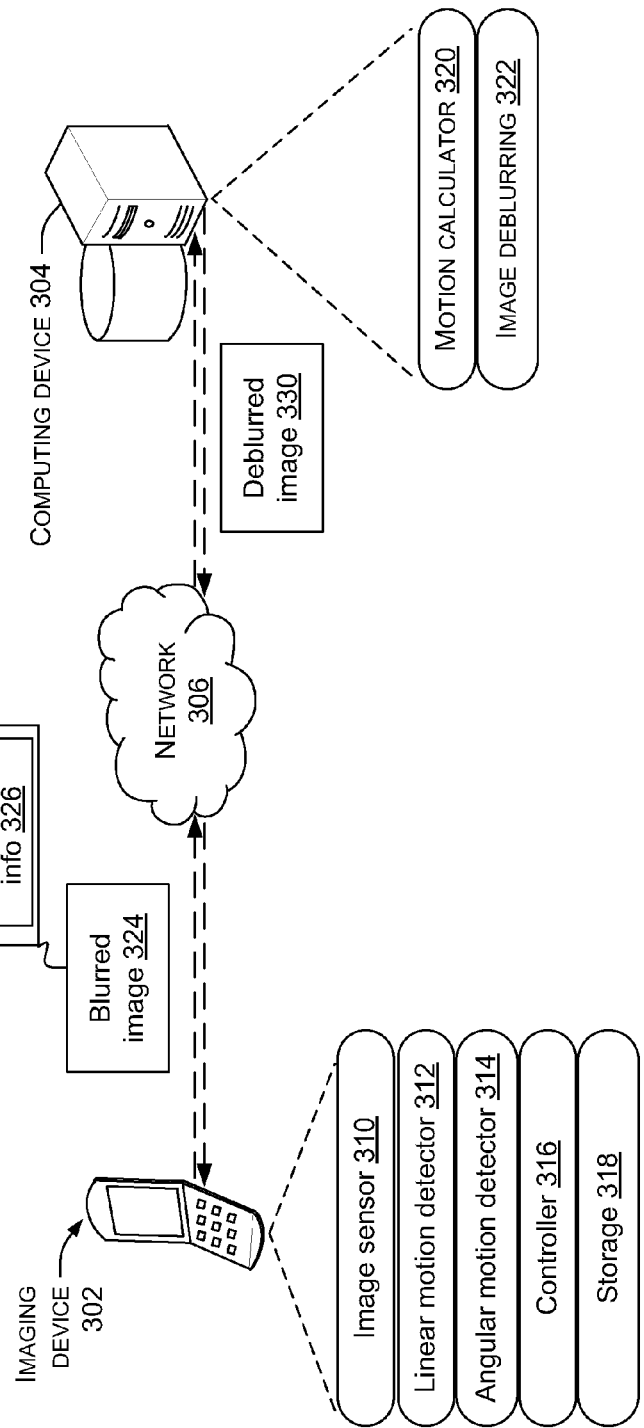
Figure 4:
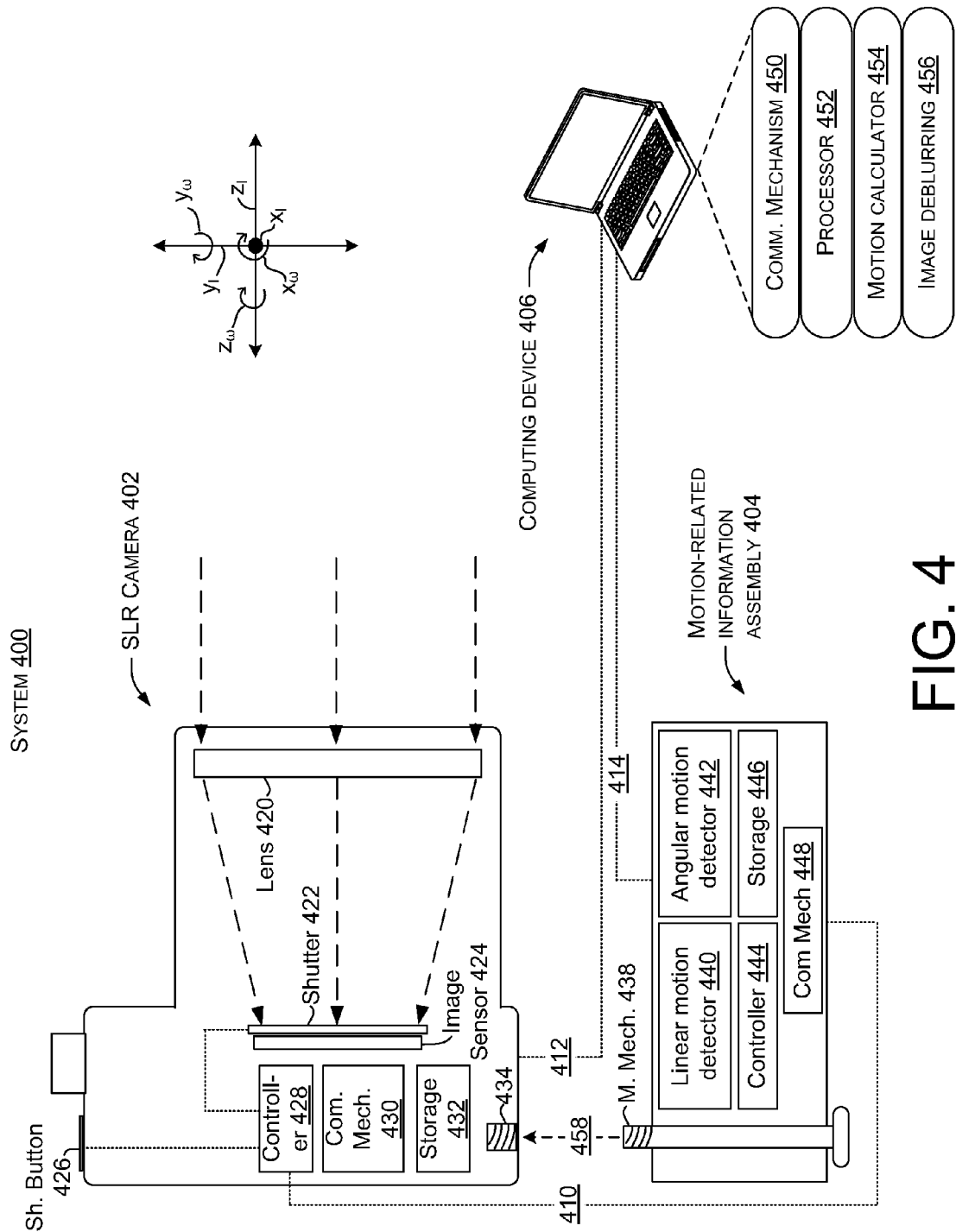

FIGS. 2-4 show three examples of systems that can accomplish the image deblurring concepts introduced above.

FIG. 2 shows a system 200 that includes an imaging device 202. In this case, the imaging device includes a lens 204, a shutter 206, an image sensor 208, a shutter button 210, a linear motion detector 212, an angular motion detector 214, a controller 216, data storage 218, a motion calculator component 220, and an image deblurring component 222.

For orientation purposes, FIG. 2 also shows six reference axes. Reference axes $x_l$, $y_l$, and $z_l$ are linear axes with the $x_l$ axis extending into and out of the printed page upon which FIG. 2 appears. Reference axes $x_\omega$, $y_\omega$, and $z_\omega$ are corresponding rotational axes. Stated another way $x_\omega$ relates to rotation around the $x_l$ axis, $y_\omega$ relates to rotation around the $y_l$ axis, and $z_\omega$ relates to rotation around the $z_l$ axis.

Image sensor 208 can be configured to convert an optical image to an electrical signal. Examples of image sensors can include charge coupled devices (CCDs) and complementary metal oxide semiconductor (CMOS) types, among others. In some configurations, the image sensor can be a generally planar array of pixels (arranged along an xy-plane in FIG. 2). Thus, light from lens 204 strikes a generally planar surface of the image sensor and can activate individual pixels of the image sensor.

In this implementation, linear motion detector 212 can capture three axis linear motion (i.e., x, y, and z axes motion). Angular motion detector 214 can capture three axis angular motion (i.e., x, y, and z axes motion). Thus, when combined, the linear motion detector 212 and the angular motion detector 214 can provide six degrees of camera motion. Other implementations can achieve satisfactory results by capturing fewer degrees of camera motion. For instance, some implementations can capture or measure x-axis and y-axis linear motion and x, y, and z-axis angular motion and achieve effective deblurring. Motion-related information during exposure of the image sensor 208 can be utilized by the motion calculator component 220 to determine imaging device motion during the exposure.

To capture an image, a user can depress shutter button 210. Depressing the shutter button can cause controller 216 to control shutter 206 in a manner that exposes image sensor 208 to electromagnetic energy (i.e., light) focused by lens 204. Duration of the exposure can be manually set by the user or automatically determined by controller 216. The controller can cause the linear motion detector 212 and angular motion detector 214 to detect camera motion during the exposure. Motion calculator component 220 can use the motion information from linear motion detector 212 and angular motion detector 214 to calculate motion of imaging device 202 during the exposure. The image deblurring component 222 can utilize the calculated motion to deblur the image.

FIG. 3 shows another system 300 that includes an imaging device 302, in the form of a Smartphone, and a computing device 304. The imaging device 302 and the computing device 304 can communicate over a network 306. The network can be any type of network, such as a user's home wireless network, the Internet, Bluetooth, and/or a cellular network, such as a third generation (3G) network, among others.

In this configuration, computing device 304 may belong to an owner of imaging device 302 or it may be a server computing device controlled by a different entity. Further, while a distinct computing device 304 is illustrated here, the provided functionality can be offered in a cloud computing scenario.

In this case, the imaging device 302, includes an image sensor 310, a linear motion detector 312, an angular motion detector 314, a controller 316, and storage 318. The computing device 304 includes a motion calculator component 320 and an image deblurring component 322.

The imaging device's image sensor 310 can capture an image or photo (hereinafter, blurred image 324) as desired by a user. Concurrently, the linear motion detector 312 and the angular motion detector 314 can capture motion-related information 326 relating to the imaging device. Controller 316 can cause image data of the image and corresponding motion information from the linear motion detector 312 and the angular motion detector 314 to be associated or bundled. In this case, the controller can cause the motion-related information 326 to be associated with the blurred image 324 as part of the image's metadata 328. The blurred image 324 with associated metadata 328 can be sent over network 306 to computing device 304. The computing device's motion calculator component 320 and image deblurring component 322 can deblur the blurred image 324 utilizing the motion-related information 326. The computing device can then return a replacement deblurred image 330 to the imaging device 302. While not specifically illustrated, the deblurred image 330 may contain some or all of metadata 328 and/or additional metadata, such as a correction that was applied to blurred image 324 to create deblurred image 330. In an instance where imaging device 302 had stored blurred image 324 in its storage 318, the imaging device may delete the blurred image and replace it with deblurred image 330. Alternatively, the imaging device could keep both images. Computing device 304 may also maintain one or both of the images for the user.

FIG. 4 shows a system 400 that includes an imaging device manifested as an SLR camera 402, a motion-related information assembly 404 and a computing device 406. In this case, the SLR camera 402, motion-related information assembly 404 and computing device 406 can be communicatively coupled as indicated at 410, 412, and 414.

In the illustrated configuration, SLR camera 402 includes a lens 420, a shutter 422, an image sensor 424, a shutter button 426, a controller 428, a communication mechanism 430, data storage 432, and a mounting mechanism 434.

Motion-related information assembly 404 includes a mounting mechanism 438, a linear motion detector 440, an angular motion detector 442, a controller 444, data storage 446, and a communication mechanism 448.

Computing device 406 includes a communication mechanism 450, a processor 452, a motion calculator component 454, and an image deblurring component 456.

Mounting mechanisms 434 and 438 are utilized to physically connect the motion-related information assembly 404 to the SLR camera 402. In this case, mounting mechanism 438 threads into mounting mechanism 434 as indicated at 458 to physically connect the motion-related information assembly 404 to the SLR camera 402. Other mechanisms can alternatively or additionally be utilized.

To capture an image, a user can depress shutter button 426. Depressing the shutter button can cause controller 428 to control shutter 422 in a manner that exposes image sensor 424 to electromagnetic energy focused by lens 420. A duration of the exposure can be manually set by the user or automatically determined by controller 428. The controller can also send a signal to the motion-related information assembly 404 that an exposure is occurring or is going to occur. In some cases, the controller can send a shutter open signal to the motion-related information assembly followed by a shutter close signal to define the beginning and end points of the exposure. In other cases, controller 428 can send a shutter open signal along with an exposure duration value. The motion-related information assembly can then sense and/or record motion information during at least a portion of the exposure duration.

The motion-related information assembly 404 can sense and/or record motion-related information during the exposure relative to at least one of the $x_l$, $y_l$, and $z_l$ linear axes and at least one of the $x_\omega$, $y_\omega$, and $z_\omega$ rotational axes. In this particular configuration, the motion-related information assembly can sense and/or record motion information along each of the $x_l$, $y_l$, and $z_l$ linear axes utilizing linear motion detector 440. Other implementations can sense less than all axes. For instance, some implementations can sense the $x_l$-axis and the $y_l$-axis but not the $z_l$-axis.

Linear motion detector 440 can include a mechanism, such as an accelerometer for sensing linear motion. This implementation utilizes a first accelerometer for detecting linear motion along the $x_l$ axis, a second accelerometer for detecting linear motion along the $y_l$ axis, and a third accelerometer for detecting linear motion along the $z_l$ axis.

Angular motion detector 442 can include a mechanism, such as an accelerometer or gyroscope for sensing angular motion. This implementation utilizes a first gyroscope for detecting angular motion along the $x_\omega$ axis, a second gyroscope for detecting angular motion along the $y_\omega$ axis, and a third gyroscope for detecting angular motion along the $z_\omega$ axis. It is worth noting that other implementations can recover rotational (i.e., angular) and translational (i.e., linear) motion using multiple accelerometers without using gyroscopes. For instance, linear and angular motion can be detected using six accelerometers that are arranged in three pairs, by sensing each axis with a pair of accelerometers at three different points on a rigid-body.

Image data captured by the image sensor 424 during the exposure can be processed by controller 428 and/or stored on storage 432. The exposure may also be associated with a unique identification (unique ID), and/or other metadata, such as the time of exposure. Some or all of this metadata can be communicated to the motion-related information assembly 404. The motion-related information assembly can associate the metadata with the corresponding motion-related information detected by the motion-related information assembly 404. The motion-related information assembly may also associate additional information with the motion information. For instance, the additional information can relate to positional information of the linear motion detector 440 and/or the angular motion detector 442 relative to SLR camera 402 or a portion thereof. For instance, the positional information may be given relative to a center of mass, center of gravity or specific component of the SLR camera. In one case, the additional information may indicate positional coordinates of the linear motion detector 440 and/or the angular motion detector 442 relative to the image sensor 424. For instance, in a hypothetical example, the additional information may indicate that the linear motion detector 440 is positioned 2.0 inches directly below (relative to the $y_I$-axis (−2.0 inches), 0.5 inches behind relative to the $z_I$-axis (−0.5 inches), and 0.0 offset relative to the $x_I$-axis of the center of image sensor 424.

In some configurations, the motion-related information assembly 404 can send the motion information (and the additional information if any) to SLR camera 402. The imaging device can then associate or bundle this information with the image. For instance, the imaging device can add the motion information from the motion-related information assembly to metadata of the image. The imaging device can then forward the image and associated metadata to computing device 406 for further processing. In other configurations, the SLR camera 402 can send the image to computing device 406 and the motion-related information assembly 404 can send the corresponding motion information to the computing device. For instance, the imaging device may send an image having a unique ID. The motion-related information assembly can send motion-related information and/or additional information that is associated with that unique ID.

Computing device 406 can process the image utilizing the corresponding motion information. For example, motion calculator component 454 can calculate motion of the imaging device during exposure of the image based upon the corresponding motion information from the motion-related information assembly. Image deblurring component 456 can deblur the image utilizing the calculated motion. The deblurred image can be maintained on computing device 406 and/or sent back to SLR camera 402. Examples of techniques that can be employed by the motion calculator component 454 and the image deblurring component 456 are described below under the heading "Motion Calculation Example".

In one configuration, motion-related information assembly 404 can be manifested as an Arduino controller board. Communication mechanism 448 can be manifested as a Bluetooth radio. Linear motion detector 440 can include a three-axis ±1:5 g MEMS accelerometer package, and angular motion detector 442 can include three single axis ±150°/s MEMS gyroscopes, wired to the Arduino controller board. These are commodity off-the-shelf components that can be purchased online. Additionally, communication indicated at 410 between the SLR camera and the motion-related information assembly can be achieved by connecting a hot shoe of SLR camera 402, i.e., flash trigger signal, to the Arduino board. In such a configuration, the trigger signal from the SLR camera can remain low for the entire length of the exposure and be high otherwise.

The Arduino board can be interrupt driven such that when the trigger signal from the SLR camera fires, the accelerometers and gyroscopes are polled at 200 Hz during the exposure window. Each time the sensors are read, the values are sent over the Bluetooth serial port interface. Additionally, an internal high-resolution counter is read and the actual elapsed time between each reading of the sensors of the linear motion detector 440 and the angular motion detector 442 can be reported.

In one case, the sensors and Arduino board are mounted to a laser-cut acrylic base that has mounting holes to secure the board, the sensors, and a battery pack (not specifically shown). The acrylic mount can be tightly screwed into the camera tripod mounting screw (i.e., mounting mechanism 438 to mounting mechanism 434).

This hardware configuration has an optional feature that can be used for calibration and validation experiments. Here, the acrylic mount has mounting holes for a Point Grey high-speed camera. When the Arduino board is sampling the inertial sensors, it can also send a 100 Hz trigger to the high-speed camera. The resultant high-speed data can be used to help calibrate the sensors and to acquire data to get ground truth measurements for motion blur.

Calibration and Ground-Truth Measurements

Several aspects of system 400 can be calibrated to aid in accurate computation of camera motion from the inertial sensors of the linear motion detector 440 and the angular motion detector 442. The sensor responses can be calibrated to address potential deviation from the specified response range. Also, as mentioned above, the position of the accelerometer(s) relative to the camera's optical center can be determined and utilized to enhance the results. Lastly, camera intrinsics are another aspect that can be addressed to increase the accuracy.

The above-mentioned aspects can be calibrated in two stages. The first stage is to calibrate the sensor's responses. This can be achieved by rotating the gyroscopes at a known constant angular velocity to recover the mapping from the 10-bit A/D output to degrees/s. This measurement can be performed at several known angular velocities to confirm that the angular motion detector's gyroscopes have a linear response. The linear motion detector's accelerometers can be calibrated by holding them stationary in six orientations with respect to gravity, (±x,±y,±z). This positional information can be utilized to map the A/D output to units of $m/s^2$.

The following technique can be used to calibrate this setup and to measure ground-truth measurements for camera-shake. This technique can accurately recover a camera's position during an exposure using a method that tracks six degrees of motion utilizing the high speed camera. This technique utilizes the high speed camera introduced above. The high speed camera can be attached to the motion-related information assembly 404. The Arduino micro-controller code can be set to trigger the high-speed camera at 100 FPS during the SLR's exposure window—this is achieved by feeding the SLR's trigger signal to the microcontroller and sending out a trigger from the micro-controller to the high-speed camera. In a lab setting, a scene can be created with a significant amount of texture. Multiple images, such as ten images can be taken with exposures ranging from $1/10^{th}$ of a second to $1/2$. For each of these images, accelerometer and gyro data can be recorded in addition to high-speed frames, all triggered synchronously. The high-speed frames from these shots can be utilized with additional wide-baseline shots from the SLR and high-speed camera to aid in 3D reconstruction. 3D reconstruction of the scene can be performed with this data using bundle adjustment (one process uses RANSAC for feature matching, computes sparse 3D structure from motion, and computes the camera focal length).

This reconstruction process gives a collection of sparse 3D points, camera rotations, and camera translations, with an unknown global transformation and a scale ambiguity between camera depth and scene depth. The scale ambiguity can be resolved by calibrating the size of a known object (in this case a calibration grid in the scene) to the known metric measurement.

Imaging Device Motion Determination Example

An image captured by the SLR camera 402 and corresponding motion information from motion-related information assembly 404 can be sent to computing device 406 for further processing. The computing device's motion calculator component 454 can calculate camera motion during image capture. The image deblurring component 456 can utilize the calculated motion information to deblur the image. One motion calculation technique that can be employed by the motion calculator component 454 to determine SLR camera motion is described in detail below.

Motion Calculation Example

For purposes of introduction, spatially-invariant image blur can be modeled as the convolution of a latent sharp image with a shift-invariant kernel plus noise, which is typically considered to be additive white Gaussian noise. Specifically, blur formation can be modeled as:

$$B = I \otimes K + N \quad (1)$$

where K is the blur kernel and $N \sim N(O,\sigma^2)$ is Gaussian noise with zero mean and standard deviation of $\sigma$. With a few exceptions, a spatially-invariant model is the assumption of most image deblurring work; however, this often does not hold in practice. In fact there are many properties of a camera and a scene that can lead to spatially varying blur. For instance such scenarios can include depth dependent defocus blur, defocus blur due to focal length variation over the image plane, depth dependent blur due to camera translation, camera roll motion, and/or camera yaw and pitch motion when there are strong perspective effects.

The described motion calculation techniques can address camera induced motion blur without interfering with "artistic blur", such as defocus blur. First, this motion calculation technique can consider the image a camera captures during its exposure window. The intensity of light from a scene point (X,Y,Z) at an instantaneous time t is captured on the image plane at a location $(u_t, v_t)$, which is a function of the camera projection matrix $P_t$. In homogenous coordinates, this can be written as:

$$(u_t, v_t, 1) = P_t(X, Y, Z, 1) \quad (2)$$

If there is camera motion, $P_t$ varies with time as a function of camera rotation and translation causing fixed points in the scene to project to different locations at each time. The integration of these projected observations creates a blurred image, and the projected trajectory of each point on the image plane is that point's point-spread function (PSF). The camera projection matrix can be decomposed as:

$$P_t = K \Pi E_t, \quad (3)$$

where K is the intrinsic matrix, $\Pi$ is the canonical perspective project matrix and $E_t$ is the time dependent extrinsic matrix that is composed of the camera rotation $R_t$ and translation $T_t$. In the case of image blur, it is not necessary to consider the absolute motion of the camera. Instead, satisfactory results can be obtained by considering the relative motion and its effect on the image. Some specific implementations can consider only the relative motion and its effect on the image.

This motion can be modeled by considering the planar homography that maps the initial projection of points at t=0 to any other time t, where the world coordinate frame is coincident with the frame at time t=0:

$$H_t(d) = \left[ K \left( R_t + \frac{1}{d} T_t N^T \right) K^{-1} \right] \quad (4)$$

$$(u_t, v_t, 1) = H_t(d)(u_0, v_0, 1) \quad (5)$$

for a particular depth d, where N is the unit vector that is orthogonal to the image plane. Thus, given an image I at time t=0 the pixel value of any subsequent image is:

$$I_t(u_t, v_t) = I(H_t(d)(u_0, v_0)) \quad (6)$$

This image warp can be re-written in matrix form as:

$$\vec{\Gamma}_t = A_t \vec{\Gamma} \quad (7)$$

where $\vec{\Gamma}_t$ and $\vec{\Gamma}$ are column-vectorized images and $A_t$ is a sparse re-sampling matrix that implements the image warp due to the homography. Each row of $A_t$ contains the weights to compute the value at pixel $(u_t, v_t)$ as the interpolation of the point $(u_0, v_0, 1) = H_t(d)^{-1} * (u_t, v_t, 1)$—this technique can use bilinear interpolation, thus there are four values per row. The technique now defines an alternate formulation for image blur as the integration of application of the homographies over time:

$$\vec{B} = \int_0^s [A_t \vec{I} \, dt] \quad (8)$$

The spatially-invariant kernel in Equation 1 is now replaced by a spatially variant kernel represented by a sparse-matrix:

$$A = \int_0^s A_t \, dt, \quad (9)$$

giving the spatially varying, linear blur model of:

$$\vec{B} = A \vec{I} + N \quad (10)$$

Thus, the camera induced, spatially variant blur estimation process is generally reduced to estimating the rotations R and translations T for times [0 ... t], the scene depths d, and camera intrinsics K. By viewing the camera-shake blur in the six degrees of motion of the camera, instead of purely in the image plane, the number of unknowns can be reduced significantly—there are six unknowns per each of M time-steps, an unknown depth per-pixel (w×h unknowns), and the camera intrinsics, of which the focal length is potentially the most important factor. This results in 6M+wh+1 unknowns as opposed to an image based approach that recovers a k×k kernel for each pixel, resulting in k²*wh unknowns. To put this in perspective, consider a one mega-pixel camera with a ¹/₁₀ of a second exposure, with 200 Hz sampling for the time-steps for this technique, versus a 10×10 kernel for an image based method—this gives 100,000,000 unknowns for an image-based method and 1,000,121 unknowns for this technique, which is 99% reduction. If the scene depth (i.e., z axis linear motion in FIG. 4) is considered to be constant, this technique would have 122 unknowns, while an image based-method would remain unchanged (since there still can be spatially varying affects even with constant depth). There is a clear advantage to considering camera-shake blur in terms of the camera-motion, such as six degrees of freedom (DOF).

If these values are known, the image can be deblurred using non-blind deconvolution. This technique can formulate image deconvolution using a Bayesian framework and find the most likely estimate of the sharp image I, given the observed blurred image B, the blur matrix A, and noise level $\sigma^2$ using a maximum a posteriori (MAP) technique.

With the present technique, the above described concept can be expressed as maximization over the probability distribution of the posterior using Bayes' rule. The result can be a minimization of a sum of negative log likelihoods:

$$P(I\,|\,B,A) = P(B\,|\,I)P(I)/P(B) \tag{11}$$

$$\arg\max_I P(I\,|\,B) = \arg\min_I [L(B\,|\,I) + L(I)] \tag{12}$$

Deconvolution can now be reduced to reducing or minimizing the negative log likelihood terms. Given the blur formation model (Equation 1), the "data" negative log likelihood can be:

$$L(B|I) = \|\vec{B} - A\vec{I}\|^2/\sigma^2 \tag{13}$$

The "image" negative log likelihood can be the sparse gradient penalty, which enforces a hyper-Laplacian distribution:

$$L(I) = \lambda \|\nabla I\|^p; p < 1 \tag{14}$$

The value $\nabla I$ indicates the spatial gradients of the image, and $\lambda$ is a regularization parameter that controls the weight of the smoothness penalty. With p<1 this model a "sparse" gradient prior, which better models the zero-peaked and heavy tailed gradient distributions seen in natural images. As an example p can equal 0.8. As the penalty function is no longer a quadratic, the minimization can be performed using iterative re-weighted least-squares.

Rigid Body Dynamics and Inertial Sensors

As discussed in the previous section, camera motion blur can be dependent on rotations R and translations T for times [0 . . . t], the scene depths d, and camera intrinsics K. This section discusses how to recover the camera rotations and translations. The section above titled "Calibration and Ground-truth Measurements" addresses recovering camera intrinsics.

In relation to camera rotations and translations, any motion of a rigid body and any point on that body, can be parameterized as a function of six unknowns, three for rotation and three for translation. The present example explains a technique for recovering these quantities given inertial measurements from accelerometers and gyroscopes (such as can be employed by linear motion detector 440 and angular motion detector 442). Accelerometers measure the total acceleration at a given point along an axis, while gyroscopes measure the angular velocity at a given point around an axis. Note that for a moving rigid body, the pure rotation at all points is the same, while the translations for all points is not the same when the body is rotating. Table 1 is a notation summary table that can be utilized in deriving the computation of camera motion from inertial measurement sensors. Here, the discussion utilizes Euler angles to represent rotation. A quaternion representation could also be used.

TABLE 1

Notation: Quantities in bold indicate measured or observed values. Note that these are vectors, i.e., three axis quantities.

| Symbol | Description |
| --- | --- |
| $^cR^o$, $^wR^c$ | Camera rotations (initial to current frame and world to current frame) |
| $\vec{\theta}_c^o$, $\vec{w}_c^o$, $\vec{a}_c^o$ | Camera angular pos., vel., accel., in initial frame |
| $\vec{w}_c^c$ | Camera angular vel. in the current frame |
| $\vec{x}_c^o$, $\vec{v}_c^o$, $\vec{a}_c^o$ | Camera pos., vel., and accel., in the initial frame |
| $\vec{a}_p^c$ | Accel. of the accelerometer in the current frame |
| $\vec{x}_p^o$ | Position of accelerometer in the initial frame |
| $\vec{r}_p^q$ | Vector from the accelerometer to center of rotation |
| $\vec{g}^o$ | Gravity in the camera's initial coordinate frame |
| $\vec{g}$ | Gravity in the world coordinate frame |

A rigid body, such as a camera, with a three axis accelerometer and three axis gyroscope (three accelerometers and three gyroscopes mounted along x, y, and z-axes in a single chip, respectively) measures the follow acceleration and angular velocity:

$$\vec{w}_c^c = {}^cR^o * \vec{w}_c^o \tag{15}$$

$$\vec{a}_p^c = {}^cR^o * \left[ \vec{a}_c^o + \vec{g}^o + (\vec{w}_c^o \times (\vec{w}_c^o \times \vec{r}_p^q)) + (\vec{a}_c^o \times \vec{r}_p^q) \right] \tag{16}$$

In one configuration, the measured acceleration is the sum of the acceleration due to translation of the camera, centripetal acceleration due to rotation, the tangential component of angular acceleration, and/or gravity, all rotated into the current frame of the camera. The measured angular velocity is the camera's angular velocity also rotated in the current frame of the camera. To recover the relative camera rotation, this technique can recover the angular velocity for each time-step in the initial frame $\vec{w}_c^o$, which can be integrated to get the angular position.

To recover relative camera translation, this technique can first compute the accelerometer position for each time-step in the initial frame. From this, the camera translation can be recovered from the collection of accelerometer positions.

The camera rotation can be recovered by sequentially integrating and rotating the measured angular velocity into the initial camera frame.

$$\vec{\theta}_c^o(t) = ({}^cR^o(t-1) * \vec{w}_c^o(t-1)) * \Delta t + \vec{\theta}_c^o(t-1) \tag{17}$$

$$^cR^o(t) = \text{angleAxisToMat}(\vec{\theta}_c^o(t)), \tag{18}$$

where "angleAxisToMat" converts the angular position vector to a rotation matrix. Since the technique is directed to relative rotation, the initial rotation is zero:

$$\vec{\theta}_c^o(0) = 0, {}^cR^o = \text{Identity} \tag{19}$$

Once the rotations are computed for each time-step, the technique can compute the acceleration in the initial frame's coordinate system:

$$\vec{a}_p^o(t) = {}^oR^c(t) * \vec{a}_p^c(t), \tag{20}$$

and integrate the acceleration, minus the constant acceleration of gravity, over time to get the accelerometer's relative position at each time-step:

$$\vec{v}_p^{\,o}(t) = (\vec{a}_p^{\,o}(t-1) - \vec{g}^{\,o}) * \Delta t + \vec{v}_p^{\,o}(t-1) \quad (21)$$

$$\vec{x}_p^{\,o}(t) = 0.5 * (\vec{a}_p^{\,o}(t-1) - \vec{g}^{\,o}) * \Delta t^2 + \vec{v}_p^{\,o}(t-1) * \Delta t + \vec{x}_p^{\,o}(t-1). \quad (22)$$

Since the emphasis is on relative position, the initial position can be set to zero, with the initial velocity assumed to be zero:

$$\vec{x}_p^{\,o}(0) = \vec{v}_p^{\,o}(0) = [0,0,0] \quad (23)$$

The accelerometer's translation (its position relative to the initial frame) in terms of the rigid body rotation and translation is:

$$\vec{x}_p^{\,o}(t) = {}^cR^o(t) * \vec{x}_p^{\,o} + \vec{x}_c^{\,o}(t) \quad (24)$$

Given this, the camera translation can be computed as:

$$\vec{x}_p^{\,o}(t) = {}^cR^o(t) * \vec{x}_p^{\,o} - \vec{x}_c^{\,o}(t) \quad (25)$$

Equation 21 subtracts the value of gravity in the initial frame of the camera. Relative to rotation, however, the initial rotation of the camera relative to the world is unknown. Initial rotation can be computed by utilizing the assumption that the measured acceleration is normally distributed about the constant force of gravity. Thus, the direction of mean acceleration vector is the direction of gravity:

$$\vec{g}^{\,o} = \text{mean}(\vec{a}_p^{\,o}(t), [0 \ldots T])) \quad (26)$$

To summarize, the camera rotation and translation can be recovered by integrating the measured acceleration and angular velocities that are rotated into the camera's initial coordinate frame. This gives the relative rotation and translation over time, which is what is utilized to compute the spatially varying PSF matrix in Equation 10.

Drift Correction

Computing motion by integrating differential inertial sensors can lead to drift in the computed result. This drift is due to the noise present in the sensor readings. The integration of a noisy signal leads to a temporally increasing deviation of the computed motion from the true motion.

Stationary gyroscope and accelerometer readings (at zero angular velocity and constant acceleration, respectively) can indicate the standard deviation of the gyroscope noise. In one experimental case the gyroscope noise was calculated to be about 0.5 deg/s and the accelerometer noise to be 0.006 m/s². In some cases there is significantly less drift in rotation. This may be due to only performing a single integration step on the gyroscope data. The double integration of accelerometers can result in more significant drift.

The present techniques can compensate for this drift by assuming it to be linear. This implies that the drift can be compensated for if the final end position of the camera is known. This is, of course, unknown; however, the drift is known to be bounded and the correct endpoint lies close to the estimate from the sensor data. Thus, the technique can perform a search in a small local neighborhood around the initial end point to refine the camera motion, which in turn improves the blur estimation accuracy.

In most cases, the camera travels on the order of only a couple millimeters total during a long exposure (such as a ½ second exposure). The drift on this time frame appears to be no more than one millimeter. It is worth noting that a shift in depth (z) by a few millimeters has little effect on the image for lenses of standard focal lengths, thus the drift in x and y tends to be the more significant source of error. The potentially optimal end-point can be searched within a 1 mm radius of the initially computed end point subject to the constraints that the acceleration along that recovered path matches the measured accelerations best in the least-squares sense. The technique could also be used with a larger search radius as needed. The potentially "optimal" end-point can be defined as the one that results in the PSF that when used to deconvolve the blurry image gives highest log-likelihood as measured with the hyper-Laplacian gradient prior discussed above.

This search can be performed using the Nelder-Mead simplex method. The Nelder-Mead simplex method is a gradient free method and the method is well behaved in a constrained, low-dimensional search space. For purposes of non-limiting example, in one case, this search was performed on the ⅒ down-sampled versions (of the 21 MP images) with an assumed depth of one meter for the entire scene. Of course other implementations can utilize other values. Note that if this depth is incorrect, this can be compensated for in the search—if the end point is perturbed equally in the x and y dimensions this can be equivalent to scaling the depth value.

The running time for this search method is about 5 minutes on a 0.75 MP image. While this is somewhat time-consuming, the search only needs to be run once either for the entire image, or could be run on a section of the image if that is preferable. Once the drift is corrected for, the PSF is more accurate for the entire image.

To summarize, hardware and blur estimation algorithms that can be used to deblur images from conventional cameras are discussed above. The present implementations can employ a combination of inexpensive gyroscopes and accelerometers to measure a camera's acceleration and angular velocity during an exposure. These implementations can be automatic, can handle per pixel, spatially varying blur and can out-perform the current leading image-based methods. Hardware and techniques to perform "ground-truth" measurements of camera motion blur are also discussed. These techniques can validate the present hardware and blur estimation approach.

There are several potential benefits to the present techniques over previous approaches: 1) the techniques can be automatic and have no user-tuned parameters; and 2) the techniques can use inexpensive commodity hardware that could easily be built into a camera or produced as a mass-market attachment.

Figure 5:
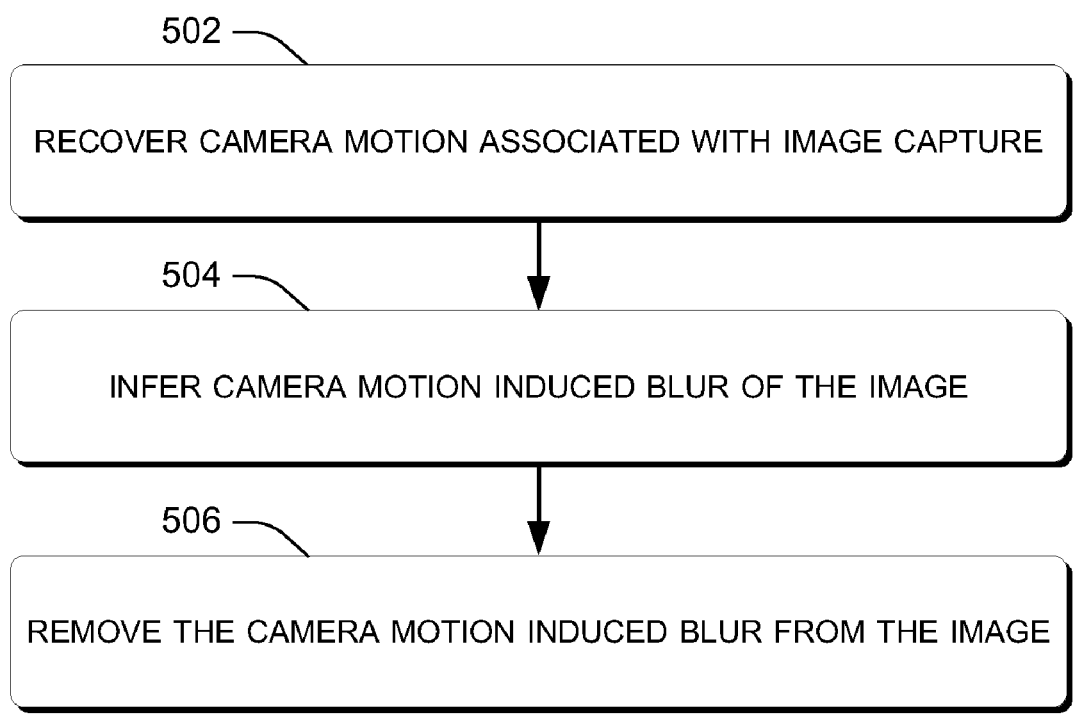
FIG. 5 is a flowchart of an exemplary image deblurring technique in accordance with some implementations of the present concepts.

The discussion above offers a very detailed example of deblurring techniques that can be employed in some implementations. FIG. 5 returns to a broad discussion of deblurring techniques offered by the present concepts.

Further Deblurring Example

FIG. 5 illustrates a flowchart of a technique or method 500 that is consistent with at least some implementations of the present concepts. The order in which the method 500 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 502, the method recovers camera motion associated with image capture.

At block 504, the method infers camera motion induced blur of the image. In one case, the method applies the camera motion to the image to obtain an initial blur correction. The initial blur correction can be utilized to compute a spatially-varying blur matrix from the initial blur correction or the blur can be approximated as a piecewise constant blur with a different convolution operation used for each constant segment.

At block 506, the method removes (or at least reduces) the camera motion induced blur from the image. In an example described above relative to block 504, the blur removal involves deconvolving the image utilizing the spatially-varying blur matrix. To summarize, camera motion blur can affect individual pixels of the image differently since each pixel is captured at a specific point on the camera's image sensor. The spatially-varying blur matrix can reflect the camera motion blur on individual pixels. Thus, camera motion blur can be removed (or at least reduced) on a per-pixel basis utilizing the spatially-varying blur matrix.

Conclusion

Although techniques, methods, devices, systems, etc., pertaining to image deblurring scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
   a camera comprising an image sensor that includes a generally planar array of pixels configured to collectively capture an image;
   a linear motion detector and an angular motion detector;
   a controller configured to receive a signal from the camera relating to the captured image and to responsively cause the linear motion detector and the angular motion detector to detect motion-related information;
   a motion calculator configured to recover camera motion associated with the captured image based upon the detected motion-related information and a position of the angular motion detector relative to a center of the generally planar array of pixels and to infer camera motion induced blur of individual pixels of the captured image based upon a distance of the individual pixels from the center; and
   an image deblurring component configured to reduce camera induced blur from the captured image by utilizing the inferred camera motion induced blur to obtain a sharp image.

2. The system of claim 1, wherein the linear motion detector comprises at least one accelerometer and the angular motion detector comprises at least one gyroscope.

3. The system of claim 1, wherein the linear motion detector comprises a first pair of accelerometers configured to detect linear and angular motion relative to a first axis, a second pair of accelerometers configured to detect linear and angular motion relative to a second axis, and a third pair of accelerometers configured to detect linear and angular motion relative to a third axis.

4. The system of claim 1, wherein the linear motion detector comprises three accelerometers configured to detect motion on three perpendicular reference axes and the angular motion detector comprises three gyroscopes configured to detect motion around the three perpendicular reference axes.

5. The system of claim 1, wherein the camera further includes a shutter and wherein the signal comprises a shutter control signal.

6. The system of claim 1, wherein the motion calculator and the image deblurring component are resident on the camera.

7. The system of claim 6, further comprising a computing device that is configured to communicate with the camera and wherein the motion calculator and the image deblurring component are resident on the computing device.

8. A computer-readable storage device having instructions stored thereon that when executed by a computing device cause the computing device to perform acts, the acts comprising:
   obtaining a photo captured by an image sensor of a camera, rotational motion information, and linear motion information associated with photo capture, and wherein the rotational motion information and the linear motion information relate to a location on the camera other than the image sensor;
   calculating camera motion during the photo capture from the rotational motion information and the linear motion information relative to the location;
   interpolating motion of the image sensor during the photo capture from the rotational motion information and the linear motion information associated with the location; and,
   deblurring portions of the photo utilizing the interpolated motion of the image sensor.

9. The computer-readable storage device of claim 8, wherein the calculating is performed on a pixel by pixel basis of the photo using the rotational motion information.

10. The computer-readable storage device of claim 8, wherein deblurring portions of the photo comprises deblurring individual pixels of the photo.

11. The computer-readable storage device of claim 8, wherein the deblurring comprises:
    applying the camera motion to the photo to obtain an initial blur correction;
    computing a spatially-varying blur matrix from the initial blur correction; and,
    deconvolving the photo utilizing the spatially-varying blur matrix to obtain a sharp image.

12. The computer-readable storage device of claim 8, wherein the rotational motion information and the linear motion information relate to a single axis of movement.

13. A method comprising:
    obtaining a blurred image captured by pixels of an image sensor of a camera, the camera comprising one or more motion sensors;
    recovering camera motion of the camera while capturing the blurred image using motion information provided by the one or more motion sensors;
    inferring blur in the blurred image, the blur being induced by the camera motion while capturing the blurred image; and
    reducing the blur in the blurred image to obtain a sharp image, the blur being reduced relative to individual pixels based upon a relative orientation of the individual pixels relative to the one or more motion sensors.

14. The method according to claim 13, performed by the camera.

15. The method according to claim 13, performed by a computing device that communicates with the camera.

* * * * *